United States Patent
Amin et al.

(10) Patent No.: US 10,462,052 B2
(45) Date of Patent: Oct. 29, 2019

(54) METHOD AND APPARATUS FOR INCREMENTAL DEPLOYMENT OF INFORMATION CENTRIC NETWORK

(71) Applicant: FUTUREWEI TECHNOLOGIES, INC., Plano, TX (US)

(72) Inventors: Syed Obaid Amin, Fremont, CA (US); Ravishankar Ravindran, San Ramon, CA (US)

(73) Assignee: Futurewei Technologies, Inc., Plano, TX (US)

( * ) Notice: Subject to any disclaimer, the term of this patent is extended or adjusted under 35 U.S.C. 154(b) by 1 day.

(21) Appl. No.: 15/854,569

(22) Filed: Dec. 26, 2017

(65) Prior Publication Data

US 2019/0199628 A1 Jun. 27, 2019

(51) Int. Cl.
*H04L 12/741* (2013.01)
*H04L 29/06* (2006.01)
*H04L 29/12* (2006.01)

(52) U.S. Cl.
CPC .......... *H04L 45/74* (2013.01); *H04L 61/2007* (2013.01); *H04L 69/22* (2013.01); *H04L 61/6059* (2013.01)

(58) Field of Classification Search
CPC ... H04L 45/745; H04L 45/741; H04L 45/748; H04L 67/2842; H04L 12/1859; H04L 12/185; H04L 61/1547; H04L 12/741; H04L 12/745; H04L 12/18; H04L 29/12; H04L 29/08; H04W 48/16; H04W 4/005; H04W 60/00; H04W 4/08; H04M 7/0012; H04M 7/00

(Continued)

(56) References Cited

U.S. PATENT DOCUMENTS 8,160,069 B2 * 4/2012 Jacobson ................ H04L 45/00
370/256
9,276,850 B2 * 3/2016 Lee ........................ H04L 45/742
(Continued)

OTHER PUBLICATIONS

A. Azgin et at, "Enabling Network Identifier (NI) in Information Centric Networks to Support Optimized Forwarding", ICN Research Group, Jul. 17, 2017, pp. 1-17.

(Continued)

*Primary Examiner* — Man U Phan
(74) *Attorney, Agent, or Firm* — FutureWei Technologies, Inc.

(57) ABSTRACT

Aspects of the disclosure provide an electronic device that includes interface circuits and processing circuitry. The interface circuits are configured to receive and transmit signals carrying packets. The processing circuitry is configured to detect that a received packet includes an Internet protocol (IP) header and an extension header to the IP header and the extension header carries an identifier of an information centric networking (ICN) technology. Further, the processing circuitry is configured to extract the identifier from the extension header, and process the received packet based on the identifier according to the ICN technology. Aspects of the disclosure provide another electronic device that is configured to generate a packet with an IP header (e.g., IPv6 header) and an extension header that carries an identifier of an ICN technology and transmit the packet.

20 Claims, 12 Drawing Sheets

(58) Field of Classification Search
USPC .......................................................... 370/392
See application file for complete search history.

(56) References Cited

U.S. PATENT DOCUMENTS

| | | | | |
|---|---|---|---|---|
| 9,942,831 | B2* | 4/2018 | Laraqui | .................. H04W 4/70 |
| 10,122,632 | B2* | 11/2018 | Trossen | .................. H04L 61/15 |
| 10,158,570 | B2* | 12/2018 | Moiseenko | ............ H04L 45/748 |
| 2017/0302576 | A1* | 10/2017 | Townsley | ............ H04L 67/1008 |
| 2018/0007176 | A1* | 1/2018 | Suthar | ..................... H04L 69/22 |
| 2018/0241669 | A1* | 8/2018 | Muscariello | ........ H04L 63/0807 |
| 2018/0270300 | A1* | 9/2018 | Reznik | ................ H04L 61/1511 |
| 2018/0367327 | A1* | 12/2018 | Trossen | .............. H04L 12/1859 |

OTHER PUBLICATIONS

Luca Muscariello, "Community Information-Centric Networking Open Source Project", Information-Centric Networking (icnrg) RG, Mar. 26, 2017, pp. 1-18.

\* cited by examiner

METHOD AND APPARATUS FOR INCREMENTAL DEPLOYMENT OF INFORMATION CENTRIC NETWORK

BACKGROUND

Information centric networking (ICN) technology is a network architecture that focuses on named information. The ICN technology evolves the Internet infrastructure away from a host-centric network that is based on connectivity and end-to-end principles. In a host centric network, such as an Internet protocol (IP) network, packets are routed based on IP addresses. IP addresses are used to identify devices and provide locations of the devices in the IP network. For example, an IP packet includes a source IP address identifying a source device and a destination IP address identifying a destination device in the IP network. The IP network can determine a path for the IP packet to be transmitted from the source device to the destination device based on the source IP address and the destination IP address in an example.

SUMMARY

Aspects of the disclosure provide an electronic device that includes interface circuits and processing circuitry. The interface circuits are configured to receive and transmit signals carrying packets. The processing circuitry is configured to detect that a received packet includes an Internet protocol (IP) header (e.g., IPv6 header) and an extension header to the IP header and the extension header carries an information centric networking (ICN) identifier. Further, the processing circuitry is configured to extract the ICN identifier from the extension header, and act on the received packet according to an action that is determined based on the ICN identifier.

Optionally, in any of the preceding aspects, another implementation of the aspect provides that the processing circuitry is configured to detect that the received packet includes a hop-by-hop option header for carrying the ICN identifier. The ICN identifier can be a content identifier for a content object, a service identifier for a service and the like.

Optionally, in any of the preceding aspects, another implementation of the aspect provides that the processing circuitry is configured to extract a source Internet protocol (IP) address and a destination IP address from the IP header of the received packet, and update a data structure to track the source IP address and the destination IP address.

Optionally, in any of the preceding aspects, another implementation of the aspect provides that the processing circuitry is configured to aggregate interest based on the data structure.

Optionally, in any of the preceding aspects, another implementation of the aspect provides that the processing circuitry is configured to determine that an interest packet for the ICN identifier is encapsulated in the received packet. In some examples, when a retrieval of a content object with a matching name to the ICN identifier fails, the processing circuitry is configured to update the received packet to replace a source IP address field with an IP address of the electronic device before forwarding.

Optionally, in any of the preceding aspects, another implementation of the aspect provides that the processing circuitry is configured to determine that an interest packet for the ICN identifier is encapsulated in the received packet. In some examples, when a retrieval of a content object with a matching name to the ICN identifier succeeds, the processing circuitry is configured to generate an outgoing packet that includes an IP header (e.g., IPv6 header) and encapsulates the content object in the outgoing packet.

Optionally, in any of the preceding aspects, another implementation of the aspect provides that the processing circuitry is configured to determine that a data packet for the ICN identifier is encapsulated in the received packet, and based thereon extract a content object corresponding to the ICN identifier, and generate one or more outgoing packets that encapsulate the content object and have different destination IP addresses from the received packet in an example. In some examples, the processing circuitry is configured to store the content object.

Aspects of the disclosure provide a method for communication. The method includes receiving, by processing circuitry in an electronic device, a packet, detecting that the packet includes an Internet protocol (IP) header (e.g., IPv6 header) and an extension header to the IP header, and the extension header carries an information centric networking (ICN) identifier. The method further includes extracting the ICN identifier from the extension header, and acting on the packet according to an action that is determined based on the ICN identifier. The ICN identifier can be a content identifier for a content object, a service identifier for a service and the like.

Aspects of the disclosure provide a non-transitory computer readable medium storing computer instructions that when executed by a processor, cause the processor to perform operations for communication. In some embodiments, the computer instructions cause the processor to receive a packet, detect that the packet includes an Internet protocol (IP) header (e.g., IPv6 header) and an extension header to the IP header, and the extension header carries an information centric networking (ICN) identifier. The computer instructions further cause the processor to extract the ICN identifier from the extension header and act on the packet according to an action that is determined based on the ICN identifier. The ICN identifier can be a content identifier for a content object, a service identifier for a service and the like.

Aspects of the disclosure provide an electronic device that includes an interface circuit configured to receive and transmit signals carrying packets, and processing circuitry configured to generate a packet with an Internet protocol (IP) header (e.g., IPv6 header) and an extension header that carries an information centric networking (ICN) identifier and transmit the packet via the interface circuit. The ICN identifier can be a content identifier for a content object, a service identifier for a service and the like.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Aspects of the disclosure provide techniques to incrementally deploy ICN technology in a network that is previously implemented using an Internet protocol (IP) networking technology.

Figure 1:
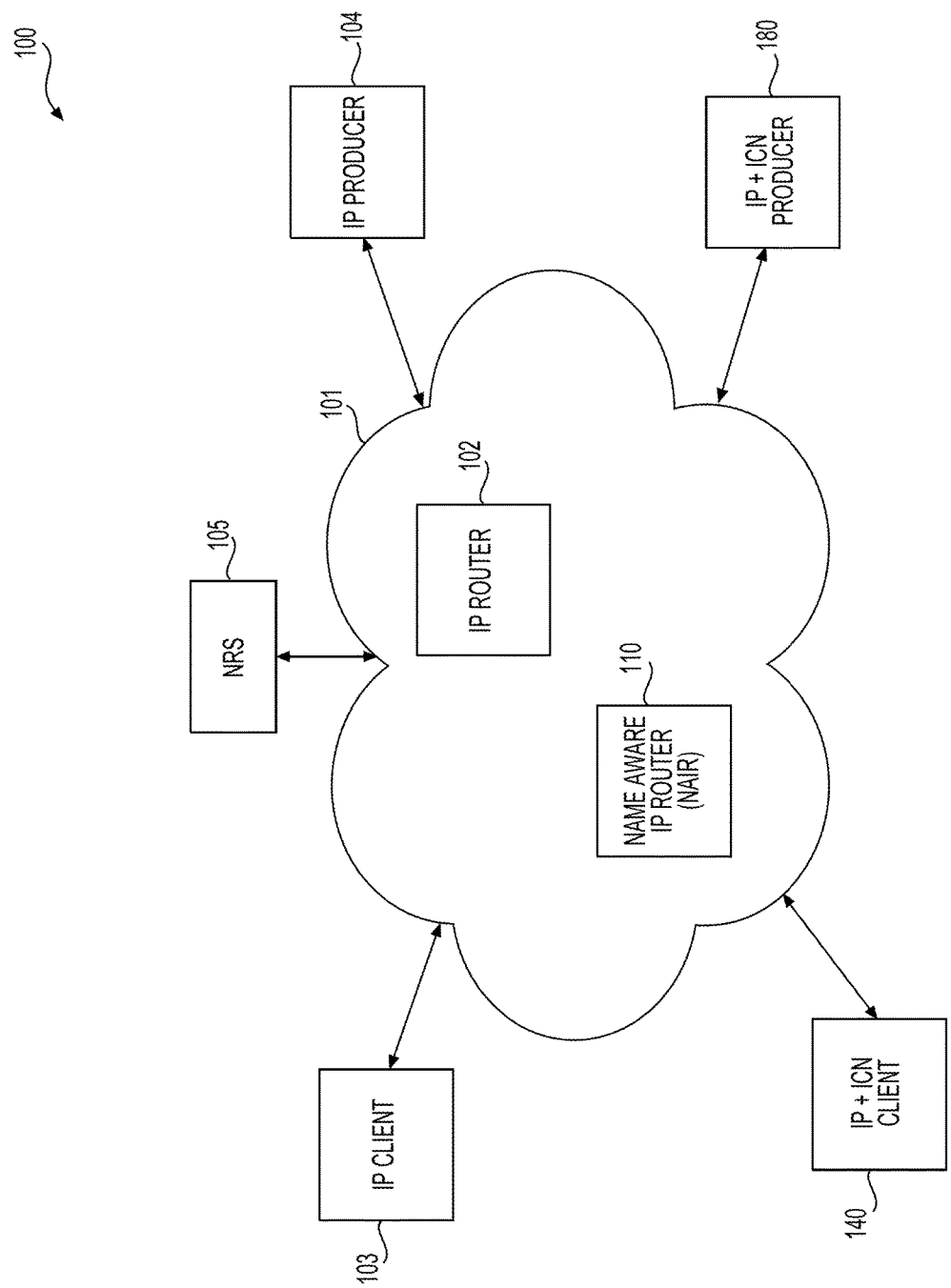
FIG. 1 shows a diagram of a communication system 100 according to an embodiment of the disclosure.

FIG. 1 shows a diagram of a network system 100 according to an embodiment of the disclosure. The network system 100 is implemented using a mix of host centric networking technology and information centric networking (ICN) technology. In an embodiment, the network system 100 is in a middle stage of incremental deployment of an ICN technology in an Internet protocol (IP) network.

According to an aspect of the disclosure, the network system 100 includes first electronic devices that are legacy devices implemented solely according to IP networking technology, and includes second electronic devices that are new devices implemented according to the ICN technology. In addition, the second electronic devices are configured to be compatible with the IP networking technology. In an example, with the incremental deployment of the ICN technology, more and more first electronic devices are replaced by second electronic devices in the network system 100.

The network system 100 can be a single network or a plurality of networks of the same or different types. In an example, the network system 100 includes a fiber optic network in connection with a cellular network. In another example, the network system 100 includes one or more local area networks that are interconnected by wide-area networks and/or the Internet. Further, the network system 100 can be a data network or a telecommunications or video distribution (e.g. cable, terrestrial broadcast, or satellite) network in connection with a data network. Any combination of telecommunications, video/audio distribution and data networks, whether a global, national, regional, wide-area, local area, or in-home network, can be used without departing from the spirit and scope of the disclosure.

The first electronic devices can be any suitable devices, such as client devices, server devices, network devices, and the like. The second electronic devices can be any suitable devices, such as client devices, server devices, network devices and the like. In the FIG. 1 example, the first electronic devices include a client device 103, a server device 104 and a network device 102 that implement IP networking technology. Further, in the FIG. 1 example, the second electronic devices include a client device 140, a server device 180 and a network device 110 that implement ICN technology and are configured to be compatible with the IP networking technology.

In an example, a client device is an electronic device in a client-server model that requests information and/or services and receives information and/or services in a network system, such as in the network system 100. The client device can be any suitable electronic device, such as a computer, a desktop computer, a laptop computer, a tablet computer, a smart phone, a smart television, and the like. It is noted that a client device can be referred to as a consumer device in some examples.

Further, in an example, a server device is an electronic device in a client-server model that provides information and/or services to other devices, such as the client devices. The server device can provide any suitable information and/or services, such as storage service, computing service, gaming service, email service and the like. It is noted that a server device can be referred to as a publisher device or a producer device in some examples.

Further, a network device is an electronic device that connects two or more computer systems, network segments, subnets and the like. The network device can be any suitable device, such as a network switch, a bridge, a router, and the like. For ease of description, in the FIG. 1 example, the network devices 102 and 110 are routers, and the router 102 is referred to as an IP router 102 that implements the IP networking technology, and the router 110 is referred to as name aware IP router (NAIR) 110 that implements ICN technology and is configured to be compatible with the IP networking technology.

According to an aspect of the disclosure, the network system 100 is configured to handle communication functions according to layers in open systems interconnection model (OSI model). The OSI model includes, from bottom to top, physical layer (layer 1), data link layer (layer 2), network layer (layer 3), transport layer (layer 4), session layer (layer 5), presentation layer (layer 6) and application layer (layer 7), for example. According to an aspect of the disclosure, the IP networking technology includes functions at the network layer to route information from a source device to a destination device based on IP addresses, and the ICN technology includes functions at the network layer to route information based on content name. In the present disclosure, information unit in the network layer is referred to as a packet. In an example, received electrical signals can be processed according to functions at the physical layer and data link layer to generate a packet that can be processed at the network layer. In another example, a packet for transmission is processed according to functions at the data link layer and the physical layer to generate electrical signals for transmission. For ease of description, the processing at the data link layer and the physical layer is omitted in the following description.

According to an aspect of the disclosure, the network system 100 delivers packets that are formatted according to an IP protocol, such as IP version 6 protocol (IPv6 protocol), and at least a portion of the packets include identifiers (IDs) to enable an ICN technology. For ease of description, the portion of the packets that include identifiers of the ICN technology are referred to as IP-ICN packets, and the rest of the packets are referred to as IP packets. In an embodiment, an IP-ICN packet includes a header that is formatted according to the IP protocol (e.g., IPv6 protocol), and includes an extension header to carry an ICN identifier. In some embodiments, the ICN identifier can be a content identifier, such as a content name for a content object, a hash of the content name, and the like. The ICN identifier can be other suitable identifier for an ICN technology, such as a service identifier that identifies a service, and the like. For illustration, content identifiers are used in the present disclosure as examples, and the content identifiers can be suitably changed to other identifiers, such as service identifiers in some embodiments. In some embodiments, the extension header includes a type identifier with values that are pre-defined to indicate a packet type in the ICN technology, such as an interest packet, a data packet, and the like. Thus, legacy devices can forward both the IP packets and the IP-ICN packets according to the IP networking technology, and the new devices can handle the IP packets according to the IP networking technology, and handle the IP-ICN packets according to the ICN technology.

In some embodiments, an interest packet in the ICN technology carries an interest (e.g., a request) for a content object, and a data packet in the ICN technology carries a data response to an interest. In some examples, an interest packet can carry a plurality of attributes of an interest, such as a content name for the content object, a remaining life time of the interest, a nonce value that is used with the content name to identify the interest packet, and the like. In some examples, a data packet can carry a content name for a content object, the content object, and other attributes of the content object, such as a fresh period of the content object, and the like.

In an embodiment, the NAIR 110 is coupled with a local storage that has a relatively large storage space. In an example, the local storage is a large storage drive that is external to the NAIR 110 and is connected with the NAIR 110 via for example cables. In another example, the local storage includes storage devices distributed in a local area network (LAN), and the NAIR 110 can access the local storage via the LAN.

In another embodiment, the NAIR 110 is within a LAN, and the LAN includes server devices, such as computing devices and the like that can provide for example computing services.

Further, the network system 100 includes a name resolution service (NRS) server 105. In an example, when a client device (or a network device) does has a name for a content object, the client device (or the network device) can send a request with the name to the NRS server 105, and the NRS server 105 can return an IP address for a producer device that produces the content object. Thus, the client device can use the IP address in an IP-ICN packet for example in the place of a destination IP address.

Figure 2:
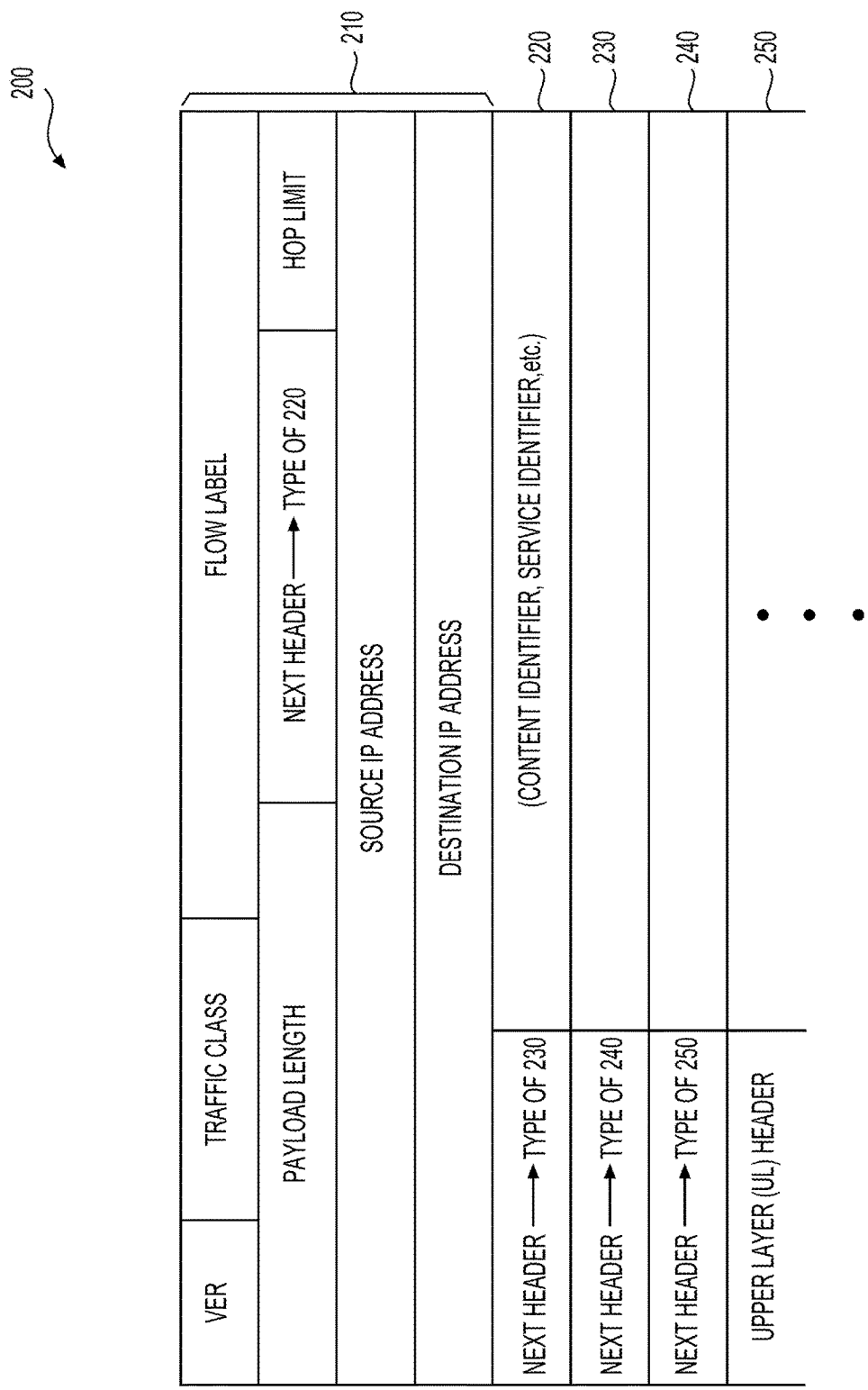
FIG. 2 shows a packet format 200 according to an embodiment of the disclosure.

FIG. 2 shows a packet format 200 according to an embodiment of the disclosure. In an example, the IP-ICN packets are configured to have the packet format 200. The packet format 200 is consistent with an IP protocol and encapsulates interest packets or data packets for the ICN technology. The packet format 200 includes a fixed header 210, one or more extension headers 220-240, and payload 250.

The fixed header 210 is configured according to the IP protocol. In the FIG. 2 example, the fixed header 210 is formatted according to Internet protocol version 6 (IPv6). Specifically, the fixed header 210 includes a version field (VER), a traffic class field (TRAFFIC CLASS), a flow label field (FLOW LABEL), a payload length field (PAYLOAD LENGTH), a next header field (NEXT HEADER), a hop limit field (HOP LIMIT), a source IP address field (SOURCE IP ADDRESS) and a destination IP address field (DESTINATION IP ADDRESS).

The fields in the fixed header 210 provide control information for addressing and routing at the network layer. In an example, the version field includes constant 6 in binary ("0110") for IPv6. The traffic class field provides information for packet classification. The flow label field provides information for outbound path control, spoofed packet detection and the like. The payload length field provides size information of the payload. The next header field specifies a type of a next extension header, such as a type of the extension header 220 in the FIG. 2 example. The hop limit field provides information to discard a packet. In an example, the hop limit field includes a value that is decremented by one at each intermediate node visited by the packet; and when the value reaches zero, the packet is discarded. The source IP address field provides the IP address of a source device, and the destination IP address field provides the IP address of a destination device.

The extension headers 220-240 provide optional information for processing at the network layer, and the extension headers 220-240 can be referred to as option headers. In an example, each extension header includes a next header field and a body portion. The next header field specifies a type of a next extension header. For example, the next header field in the extension header 220 specifies a type of the extension header 230, the next header field in the extension header 230 specifies a type of the extension header 240, the next header field in the extension header 240 specifies a type of an upper layer or payload, such as a type of a transport layer and the like. According to an aspect of the disclosure, one or more extension headers 220-240 include a content identifier for use in the ICN technology. In an embodiment, the content identifier is carried by a hop-by-hop option (HHO) header. HHO headers are examined by all nodes, such as the source device, the destination device, routers and switches and the like on a transmission path of the packet.

In the FIG. 2 example, the content identifier is carried by the extension header 220. When the extension header 220 is an HHO header, the next header field in the fixed header 210 includes a value that is indicative of the HHO type for the extension header 220. In an example, value "0" is predefined to be indicative of an HHO header.

In an example, the payload 250 is ICN payload.

The packet format 200 can be used for interest packets and data packets. When an interest packet is encapsulated in the packet format 200, the IP-ICN packet is referred to as an IP-ICN interest packet; and when a data packet is encapsulated in the packet format 200, the IP-ICN packet is referred to as an IP-ICN data packet.

Figure 3:
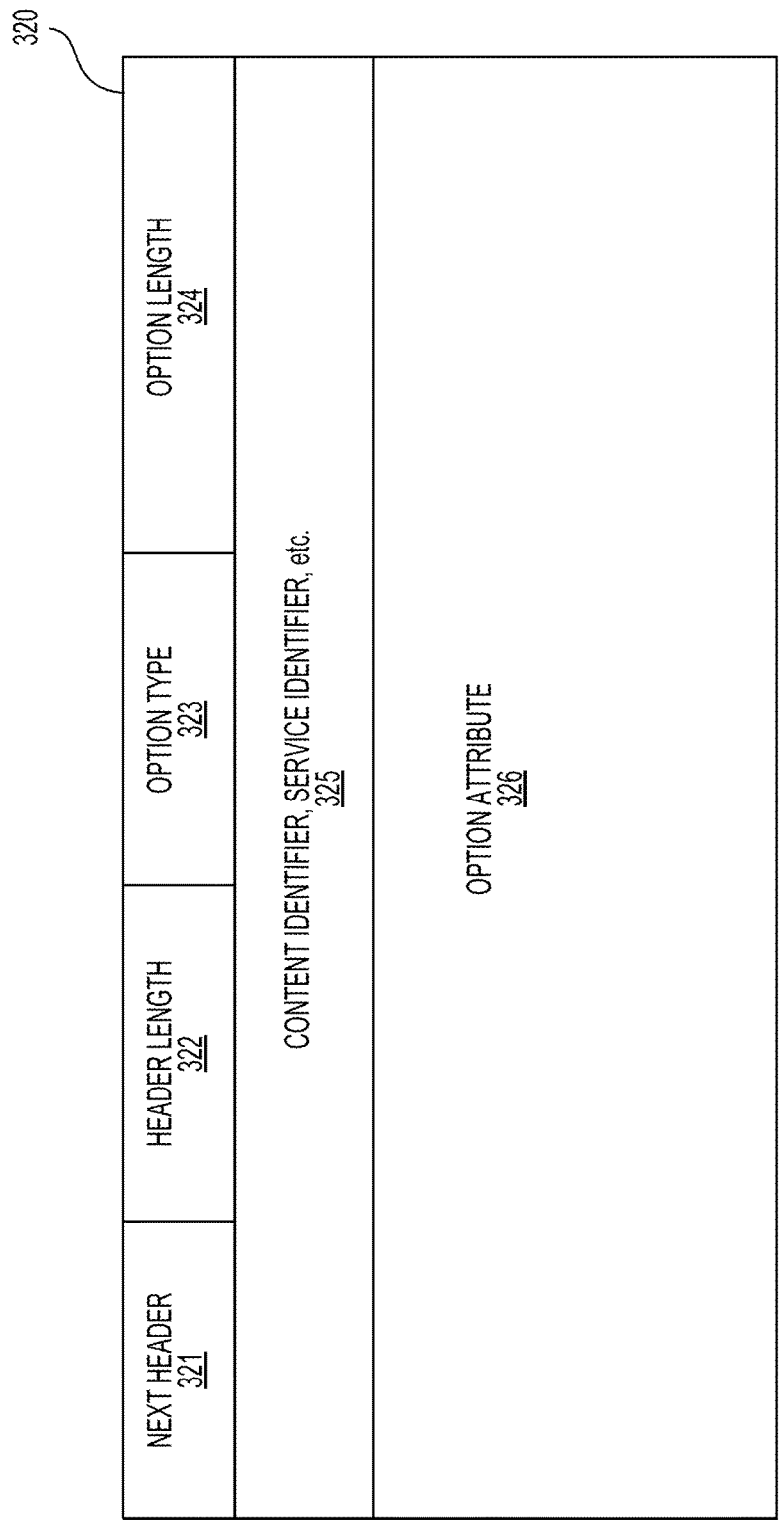
FIG. 3 shows a hop-by-hop option header format 320 according to an embodiment of the disclosure.

FIG. 3 shows a hop-by-hop option (HHO) header 320 according to an embodiment of the disclosure. In an example, the HHO header 320 is used in the packet format 200 in the place of the HHO header 220.

In the FIG. 3 example, the HHO header 320 includes a next header field 321, a header length field 322, an option type field 323, an option length field 324, a content identifier field 325 and option attribute field 326.

In an example, the next header field 321 specifies a type of a next extension header (e.g., extension header 230). The header length field 322 provides size information of the HHO header 320. The option type field 323 provides an identifier indicative of a type of the option. The option length field 324 provides a length information of a combination of the content identifier field 325 and the option attribute field 326.

In an embodiment, the option type field 323 includes 8 bits in binary. The first two most significant bits are "00" in an example. When a router, such as the IP router 102 does not recognize this option, the router can skip the HHO header 320. The third most significant bit is indicative a change characteristic for the option attribute field 326. For example, when the third most significant bit is "0" in binary, the option attribute field 326 does not change on the path of the packet; and when the third most significant bit is "1" in binary, the option attribute field 326 can change on the path of the packet. The 5 least significant bits in binary are used to provide an option identifier that is pre-defined to indicate an option. In an example, a first combination of the 5 binary bits is pre-defined to indicate that the packet is an interest packet, and a second combination of the 5 binary bits is pre-defined to indicate that the packet is a data packet. When the packet is an interest packet or a data packet, the payload of the packet (e.g., payload 250) is ICN payload according to ICN technology.

The content identifier field 325 carries a content identifier. In an embodiment, the content identifier field 325 includes 128 binary bits. The content identifier field 325 can carry the whole name of the content or a hash of the name, for example when the name is longer than 128 bits. The option attribute field 326 is configured to carry metadata, such as security, and the like of the interest (the request) for the content object, or the content object.

Figure 4:
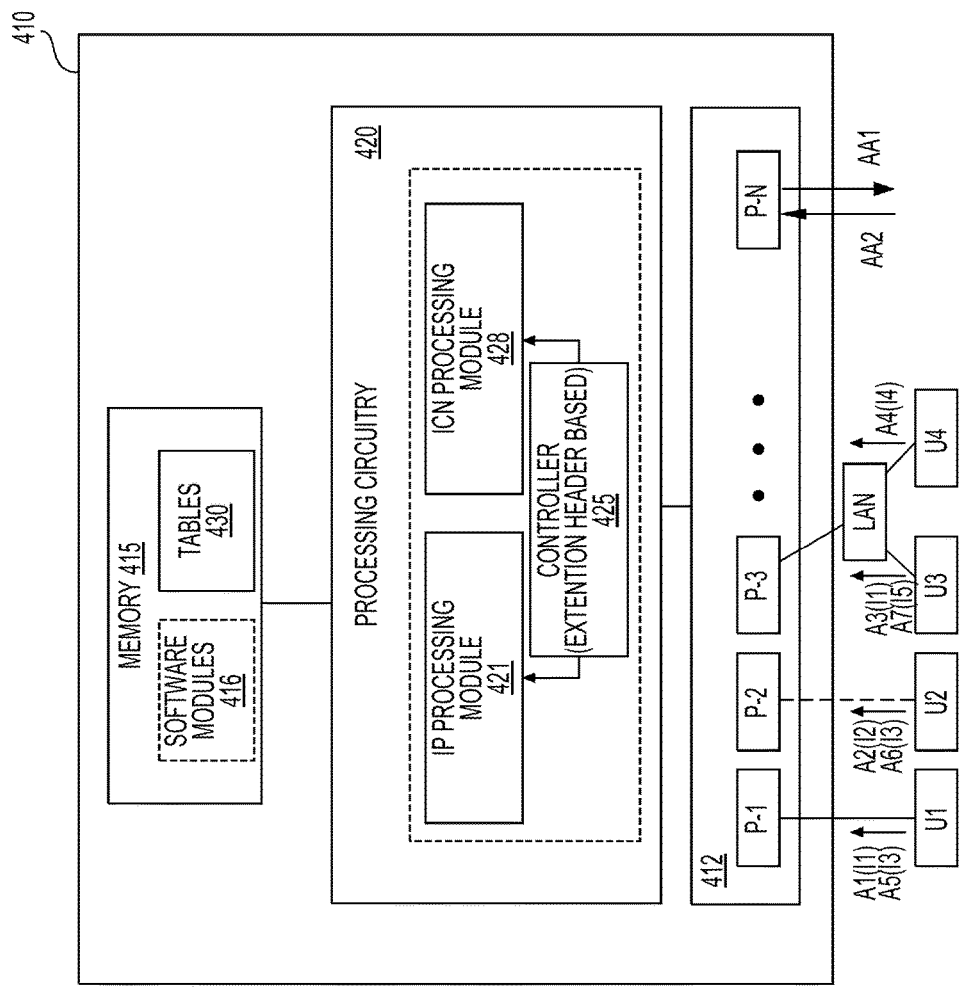
FIG. 4 shows a block diagram of a network device 410 according to an embodiment of the disclosure.

FIG. 4 shows a block diagram of a network device 410 according to an embodiment of the disclosure. In an example, the network device 410 is used in the network system 100 in the place of the NAIR 110. The network device 410 includes various functional circuit blocks, such as interface circuitry 412, processing circuitry 420, memory 415, and the like coupled together for example using suitable interconnection architecture (not shown), such as a bus architecture.

The interface circuitry 412 includes suitable circuits to form a plurality of network interfaces P-1 to P-N. In an example, each of the plurality of network interfaces P-1 to P-N is configured to couple another suitable device in a communication network via a respective communication link. For example, the network interface P-1 is configured according to Ethernet technology, and an Ethernet cable is used to couple a user device U1 to the network device 410 via the network interface P-1. Further, in the example, the network interface P-2 is configured according to cellular communication technology, and a user device U2 is coupled to the network device 410 via the network interface P-2 and a cellular communication service provider network (not shown). In the example, the network interface P-3 is connected in a local area network (LAN), such as being connected to a router in the LAN. In an example, the router is a wireless router configured according to a WiFi technology, and a wireless local area network (WLAN) is setup to couple user device U3 and U4 with the network device 410 via the network interface P-3 and the LAN.

In an example, the user devices U1-U4 are client devices that are similarly configured as the client device 140.

The processing circuitry 420 is configured to process packets and to determine actions, such as sending a packet to a destination, encryption/decryption, fragmentation, multicasting, dropping a packet, and the like. In an embodiment, the processing circuitry 420 is implemented using dedicated packet processing circuits. In another embodiment, the processing circuitry 420 is implemented using one or more general processing circuit units, such as multi-processing cores, that can execute software instructions for packet processing.

The memory 415 stores information for routing and stores software instructions to be executed by the processing circuitry 420. In an embodiment, the memory 415 stores software modules 416 for packet processing. In an example, the processing circuitry 420 executes the software modules 416 to perform packet processing. The memory 415 is implemented using any suitable storage device, such as a static random access memory (SRAM), a dynamic random access memory (DRAM), a flash memory, a solid state drive, a hard drive, an optical drive, and the like.

In an embodiment, an ICN technology uses a plurality of tables 430 to track information for routing, and the plurality of tables 430 is stored in the memory 415. In an example, the plurality of tables 430 includes a pending interest table (PIT), a forwarding label table (FLT), a socket description table (SDT), and the like.

According to an aspect of the disclosure, the processing circuitry 420 is configured to process an IP packet according to the IP networking technology, and process an IP-ICN packet according to ICN technology. Specifically, the processing circuitry 420 includes an IP processing module 421, an ICN processing module 428, and a controller 425 coupled together as shown in FIG. 4. The controller 425 is configured to parse a received packet to extract header information, and select one of the IP processing module 421 and the ICN processing module 428 for packet processing based on the header information.

In an embodiment, the IP processing module 421, the ICN processing module 428 and the controller 425 are implemented in circuitry, such as application specific integrated circuit (ASIC). In another embodiment, the IP processing module 421, the ICN processing module 428 and the controller 425 are implemented as processing cores (e.g., one or more processors) executing software instructions.

In an embodiment, the controller 425 extracts extension header information and selects one of the IP processing module 421 and the ICN processing module 428 for packet processing based on the extension header information. In an example, the controller 425 extracts an HHO header in a packet, and determines whether the HHO header is indicative of ICN packet (e.g., an interest packet, a data packet in ICN). When the HHO header does not indicate ICN packet, the controller 425 selects the IP processing module 421 to process the packet. When the HHO header is indicative of ICN, the controller 425 selects the ICN processing module 428 to process the packet.

Specifically, in the FIG. 4 example, the user devices U1-U4 are client devices that are similarly configured as the client device 140. In an example, the user device U1 is assigned IP address IP1, the user device U2 is assigned IP address IP2, the user device U3 is assigned IP address IP3, and the user device U4 is assigned IP address IP4.

In an example, the user devices U1-U4 are configured to encapsulate interests I1-I5 in IP-ICN interest packets A1-A7 in the packet format 200. For example, the user device U1 sends out IP-ICN interest packets A1 and A5. The IP-ICN interest packet A1 includes a content name for interest I1 in an HHO header. The IP-ICN interest packet A5 includes a content name for interest I3 in an HHO header. The user device U2 sends out IP-ICN interest packets A2 and A6. The IP-ICN interest packet A2 includes a content name for interest I2 in an HHO header. The IP-ICN interest packet A6 includes a content name for interest I3 in an HHO header. The user device U3 sends out IP-ICN interest packets A3 and A7. The IP-ICN interest packet A3 includes a content name for interest I1 in an HHO header. The IP-ICN interest packet A7 includes a content name for interest I5 in an HHO header. The user device U4 sends out IP-ICN packet interest A4. The IP-ICN interest packet A4 includes a content name for interest I4 in an HHO header.

In an embodiment, to encapsulate an interest in an IP-ICN packet, a user device, such as one of the user devices U1-U4 sends a request with a name to, for example the NRS provider 105, and receives an IP address for a producer device that provides content object corresponding to the name. Thus, the user device generates an IP-ICN packet in the packet format 200 for example, inserts the IP address of the user device in the source IP address field, inserts the IP address for the producer device in the destination IP address field, and includes a content identifier (a name or hash of the name) corresponding to the content object in an HHO header, such as the HHO header 320, of the IP-ICN packet. In an example, the user device assigns a pre-defined value that is indicative of an interest packet in the, for example the option type field 323 in the HHO header 320.

The IP-ICN packets A1-A7 are received by the network device 410 and processed by the network device 410, for example by the ICN processing module 428. The ICN processing module 428 then updates tables 430, drops packets or forwards packets based on the tables 430.

In an example, a first producer device with an IP address of IP6 can provide content object having matching content name to the interest I1; a second producer device with an IP address of IP7 can provide content object having matching content name to the interest I2; a third producer device with an IP address of IP8 can provide content object having matching content name to the interest I3; a fourth producer device with an IP address of IP9 can provide content object having matching content name to the interest I4; and a fifth producer device with an IP address of IP5 can provide content object having matching content name to the interest I5.

Figure 5:
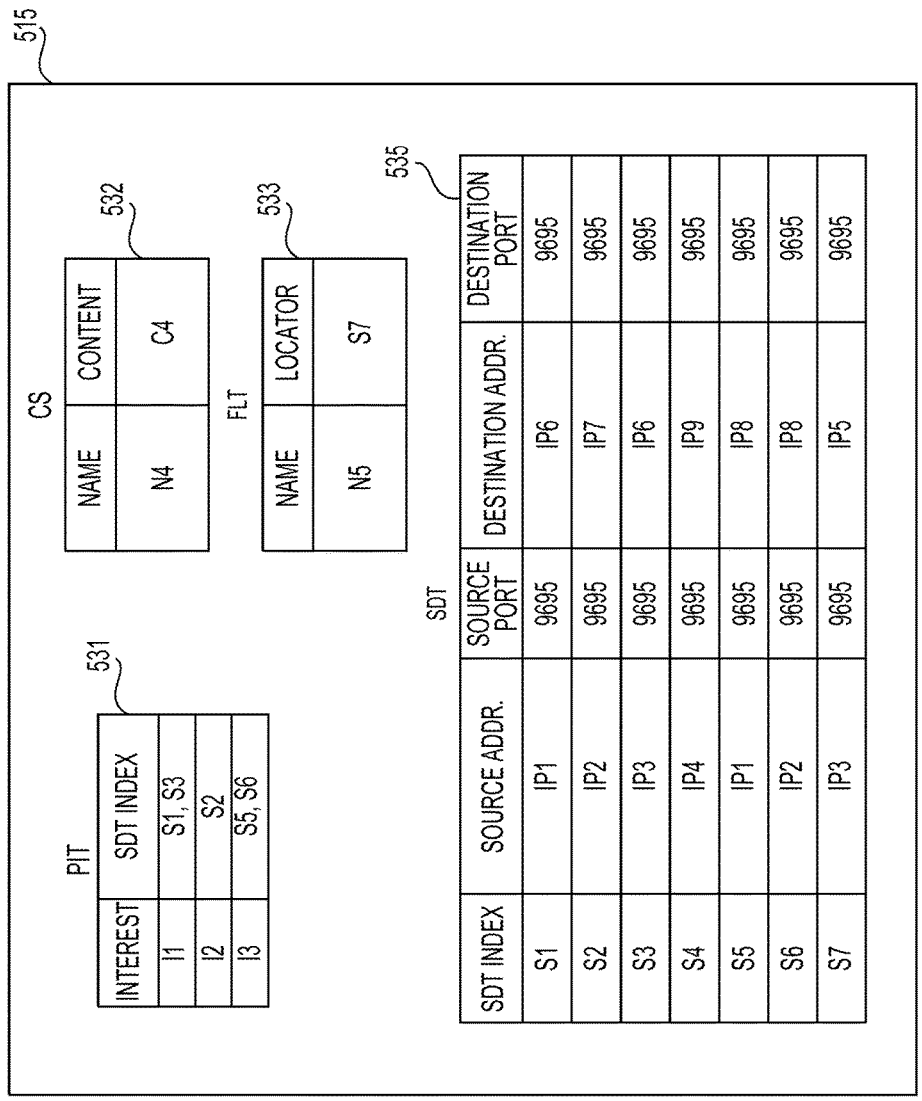
FIG. 5 shows a plurality of tables stored in a memory 515 according to an embodiment of the disclosure.

FIG. 5 shows a plurality of tables stored in a memory 515 according to an embodiment of the disclosure. The memory 515 stores a plurality of tables, such as a PIT 531, a FLT 533, a SDT 535 and the like. The memory 515 also stores content objects, such as in the form of a content store (CS) 532. In an example, the network device 410 maintains the tables and the CS 532 to perform ICN functions.

The SDT 535 is configured to track socket information, and is used for interest aggregation in an example. The SDT 535 includes an SDT index field (SDT INDEX), a source address field (SOURCE ADDR.), a source port field (SOURCE PORT), a destination address field (DESTINATION ADDR.) and a destination port field (DESTINATION PORT). In an example, a combination of an IP address and a port (an endpoint of communication in an operating system) is referred to as a socket. The SDT 535 tracks source socket and destination socket of received IP-ICN interest packets in an example. For example, when the ICN processing module 428 receives an interest packet, an entry in the SDT 535 is generated to record the source socket information of the interest packet and the destination socket information of the interest packet.

For example, when the network device 410 receives the IP-ICN interest packet A1, the IP-ICN interest packet A1 is parsed, the controller 425 extracts the HHO header, determines that the IP-ICN interest packet A1 is an interest packet based on the HHO and selects the ICN processing module 428 to process the IP-ICN interest packet A1. The ICN processing module 428 then generates an entry in the SDT 535, such as the entry with SDT index S1 based on the IP-ICN interest packet A1. It is noted that in an example, the ICN processing module 428 extracts a source IP address and a destination IP address from the IP header, and extracts a source port number and a destination port number from an upper layer header, such as layer 4 header.

Similarly, the network device 410 receives the IP-ICN interest packets A2-A7, and generates entries S2-S7 in the SDT 535 respectively.

It is noted that the SDT 535 includes both source socket information and destination socket information. In an embodiment, the destination socket information can be used to generate IP-ICN data packets when the content is served locally, for example at the network device 410.

The PIT 531 is configured to store pending interests to which the corresponding data responses have not been received yet. In the FIG. 5 example, the PIT 531 includes an interest field, and an SDT index field. For each entry, the interest field provides an interest, such as a content identifier for a content object in an interest packet, a remaining time before the interest expires and the like, and the SDT index field provides SDT indexes of entries in the SDT 535 that correspond to some IP-ICN interest packets that include the content identifier. The PIT 531 includes aggregated interest for the same content identifier.

In an example, the network device 410 receives IP-ICN interest packets A1 and A3 that includes the same content identifier for the interest I1, the PIT 531 aggregates the SDT indexes for A1 and A3 to corresponding to the same interest I1. In an example, the network device 410 generates an IP-ICN interest packet AA1 for the interest I1 based on the IP-ICN interest packets A1 and A3. For example, the source IP address in the IP-ICN interest packet AA1 is changed to be the IP address of the network device 410. Thus, a producer that receives the IP-ICN interest packet AA1 can send back an IP-ICN data packet AA2 to the network device 410. Then, the network device 410 generates two IP-ICN data packets based on the IP-ICN data packet AA2, for example with destination IP address changed from the IP address of the network device 410 to the IP1 and IP3. The two IP-ICN data packets are sent respectively to the user device U1 and U3 based on the destination IP address.

In another example, the SDT 535 is used to aggregate interest. In some embodiments, destination socket information is indicative of a source (e.g., a producer device and an application running on the producer device) that produces a content object. For example, when entries of the SDT 535 have the same destination socket information, the related interested to the entries have the same source that produces content objects, thus the related interests to the entries have the same name prefixes (or relatively long common name prefixes) in the content names, thus the related interests can be aggregated. For example, the entries S1 and S3 have the same destination socket information, thus the related interests to the entries S1 and S3 are aggregated to form one entry for interest I1 in the PIT 531.

In an example, the CS 532 is a buffer memory organized for retrieval of content objects by matching look-up names. For example, the CS 532 includes a content object C4 associated with a content name N4. In an example, the interest I4 matches the content name N4. In an embodiment, the CS 532 is an IP level content store that provides storage to save content objects in the form of IP-ICN data packets. The IP-ICN data packets are indexed based on the content identifiers in the HHO headers of the IP-ICN data packets. In another embodiment, the CS 532 is configured to store the content objects. In an example, the network device 410 uses the SDT 535 to encapsulate content objects into IP-ICN data packets. For example, when the entry N4 in the CS 532 is linked to S4 in the SDT 535. The network device 410 can generate an IP-ICN data packet to encapsulate the content object C4, and use the destination socket information of the S4 as source socket information (e.g., the source IP address and the source port) in the IP-ICN data packet.

The FLT 533 is configured to store special routes for some namespaces (some content names for content objects, some service names for services, and the like). In an example, the routes in the FLT 533 are prioritized higher than default forwarding information base (FIB) according to the IP protocol. In an embodiment, the FLT 533 includes a name field and a locator field. The name field specifies a content identifier, and the locator field is indicative of a specific route. In the FIG. 5 example, an entry in the FLT 533 includes a content identifier N5 in the name field and includes an index S7 in the locator field. In an example, the user device U3 is connected with the network device 410 by WLAN. After the user device U3 receives a content object with content name N5 in response to the interest I5, the content object with the content name N5 is available to the network device 410 locally. Thus, the entry is added in the FLT 533 to indicate that the user device U3 (corresponding to the source IP in the index S7) can provide a content object with the content identifier N5. For example, the network device 410 can forward an interest packet (for the interest I5) to the user device U3, the user device U3 can provide the content object with the content name N5 to the network device 410 via the LAN.

Figure 6A:
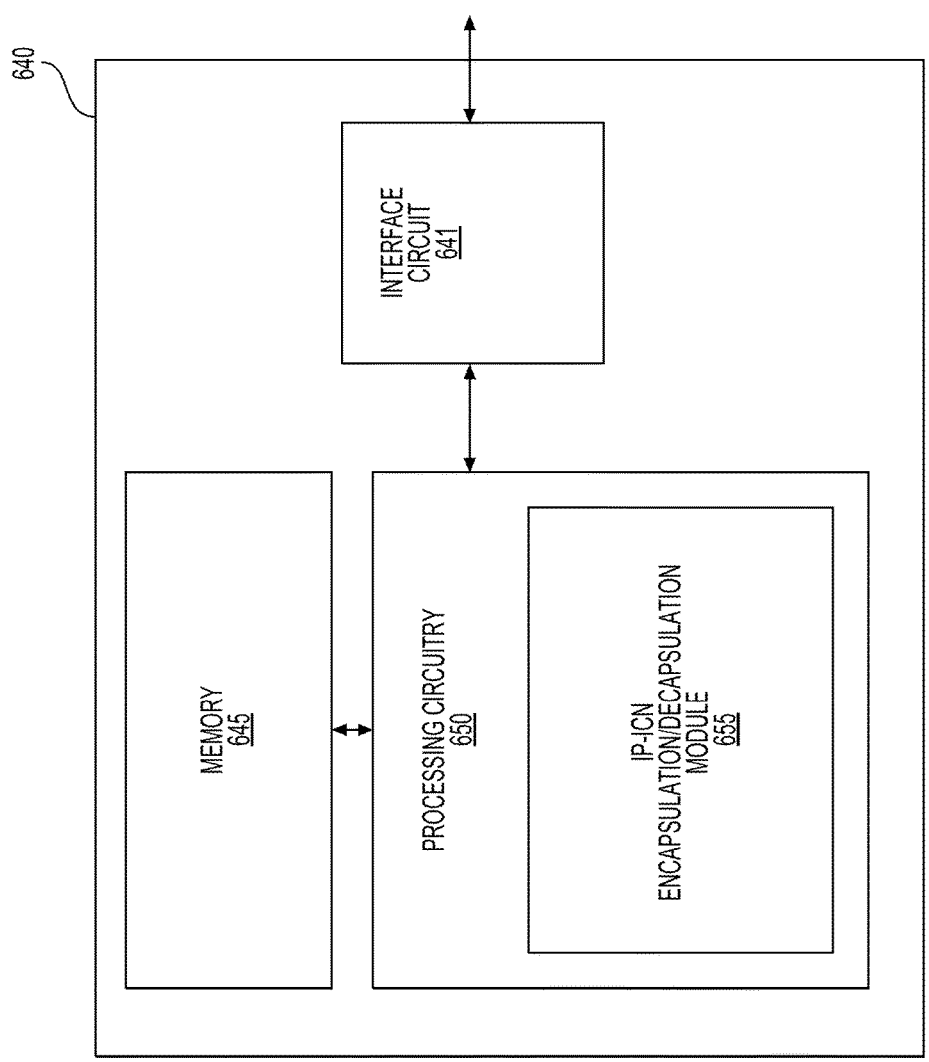
FIG. 6A shows a block diagram of a client device 640 according to an embodiment of the disclosure.

FIG. 6A shows a block diagram of a client device 640 according to an embodiment of the disclosure. In an example, the client device 640 is used in the network system 100 in the place of the client device 140. The client device 640 includes an interface circuit 641, a processing circuitry 650 and a memory 645 coupled together as shown in FIG. 6A.

The interface circuit 641 is configured to receive signals and transmit signals that carry IP-ICN packets. The interface circuit 641 can be implemented using any suitable technology. In an embodiment, the interface circuit 641 is configured to receive and transmit wireless signals. In an example, the interface circuit 641 is configured to receive and transmit wireless signals according to a suitable wireless communication technology, such as second generation (2G) mobile network technology, third generation (3G) mobile network technology, fourth generation (4G) mobile network technology, fifth generation (5G) mobile network technology, global system for mobile communication (GSM), long-term evolution (LTE), WiFi technology, Bluetooth technology, and the like. In another embodiment, the interface circuit 641 is configured to accept wires and can be electronically connected to the wires (e.g., Ethernet cable, USB cable). The wires couple the client device 640 with another device, such as the router 140, and the like. The interface circuit 641 receives signals transmitted from the other device over the wires or transmits signals onto the wires.

In an example, the processing circuitry 650 is configured to perform packet processing of IP-ICN packets by executing instructions in memory 645. In the FIG. 6A example, the processing circuitry 650 includes IP-ICN encapsulation/de-capsulation module 655. In an example, the IP-ICN encapsulation/de-capsulation module 655 is configured to encapsulate an interest packet in the ICN technology into an IP-ICN interest packet, such as in the packet format 200. In another example, the IP-ICN encapsulation/de-capsulation module 655 is configured to de-capsulate an IP-ICN data packet for example of the packet format 200 to extract content object.

The memory 645 is configured to store software instructions and data.

In an embodiment, the IP-ICN encapsulation/de-capsulation module 655 is implemented as circuitry. In another embodiment, the IP-ICN encapsulation/de-capsulation module 655 is implemented as a processor (e.g., central processing unit) executing software instructions stored in the memory 645.

Figure 6B:
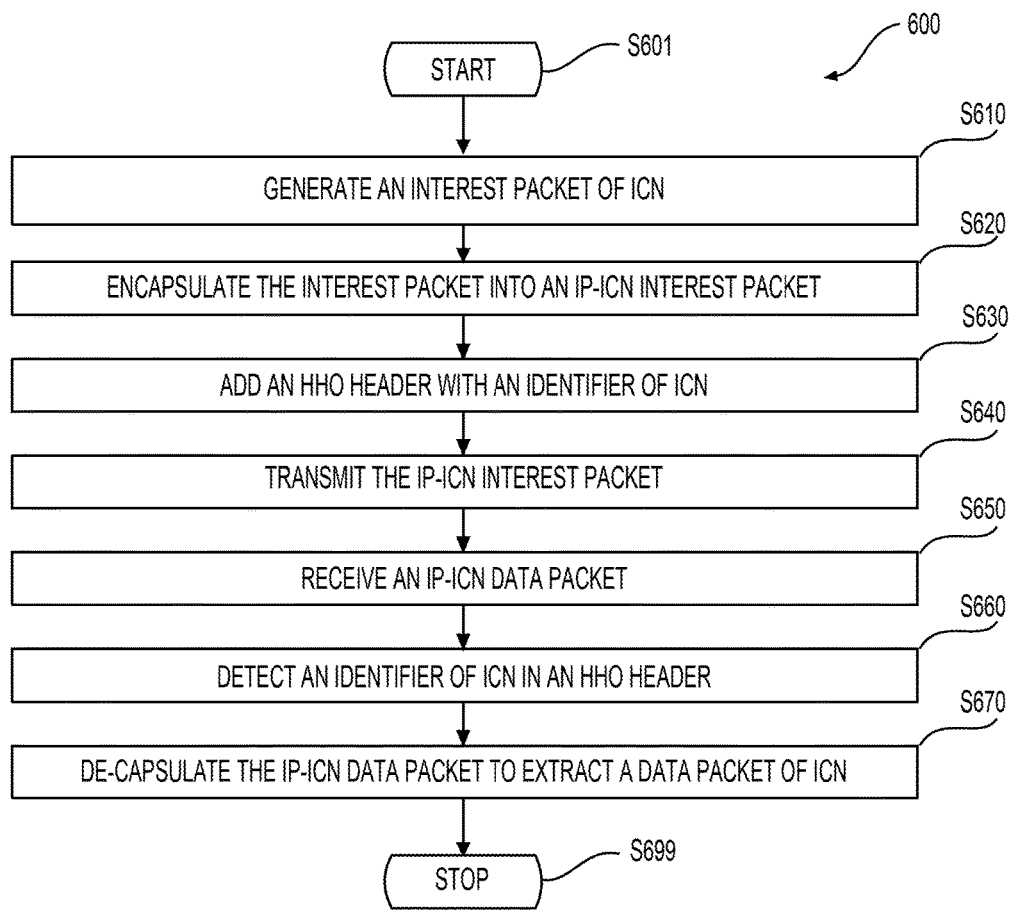
FIG. 6B shows a flow chart outlining a process executed by the client device 640 according to an embodiment of the disclosure.

FIG. 6B shows a flow chart outlining a process 600 executed by the client device 640 according to an embodiment of the disclosure. The process starts at S601 and proceeds to S610.

At S610, an interest packet is generated. In an example, the client device 640 desires a content object having a content name. The client device 640 generates an interest packet according to the ICN technology to request the content object.

At S620, the interest packet is encapsulated in an IP packet to generate an IP-ICN interest packet. In an example, the client device 640 sends a request with the content name to a NRS server, and the NRS server returns an IP address for a producer device that produces the content object. Then, the client device 640 encapsulates (e.g., by the IP-ICN encapsulation/de-capsulation module 655) the interest packet into an IP-ICN interest packet, for example as a payload of the IP-ICN interest packet. The client device 640 generates the IP header (e.g., IPv6 header) for the IP-ICN interest packet. In the IP header, the IP address for the producer device is in the destination IP address field in an example.

At S630, an HHO header with an ICN identifier of the ICN technology is added in the IP-ICN interest packet. In an example, the client device 640 suitably adds an HHO header in the IP-ICN interest packet, and includes a content identifier in the HHO header. It is noted that when the client device 640 desires a service, the client device 640 can include a service identifier in the HHO header. The HHO header is also configured to be indicative of an interest packet in an example.

At S640, the IP-ICN interest packet is transmitted. In an example, the interface circuit 641 transmits signals carrying the IP-ICN interest packet.

At S650, an IP-ICN data packet is received. In an example, the interface circuit 641 receives signals carrying an IP-ICN data packet.

At S660, an HHO header with the ICN identifier is detected. In an example, the client device 640 parses the header of the IP-ICN data packet, and detects an HHO header. Further, the client device 640 detects that an option type in the HHO header is indicative of a data packet and detects, for example, the content identifier in the HHO header.

At S670, the IP-ICN data packet is de-capsulated to extract a data packet of the ICN technology. In an example, the client device 640 extracts a payload of the IP-ICN data packet. The payload includes the data packet in response to the interest packet. The data packet is then suitably handled according to the ICN technology. Then, the process proceeds to S699 and terminates.

It is noted that, in some embodiments, after the IP-ICN interest packet is transmitted at S640, the client device 640 performs other suitable operations, such as interactions with a user, and the like. When the client device 640 receives signals that carry an IP-ICN data packet, the process continues at S650.

Figure 7A:
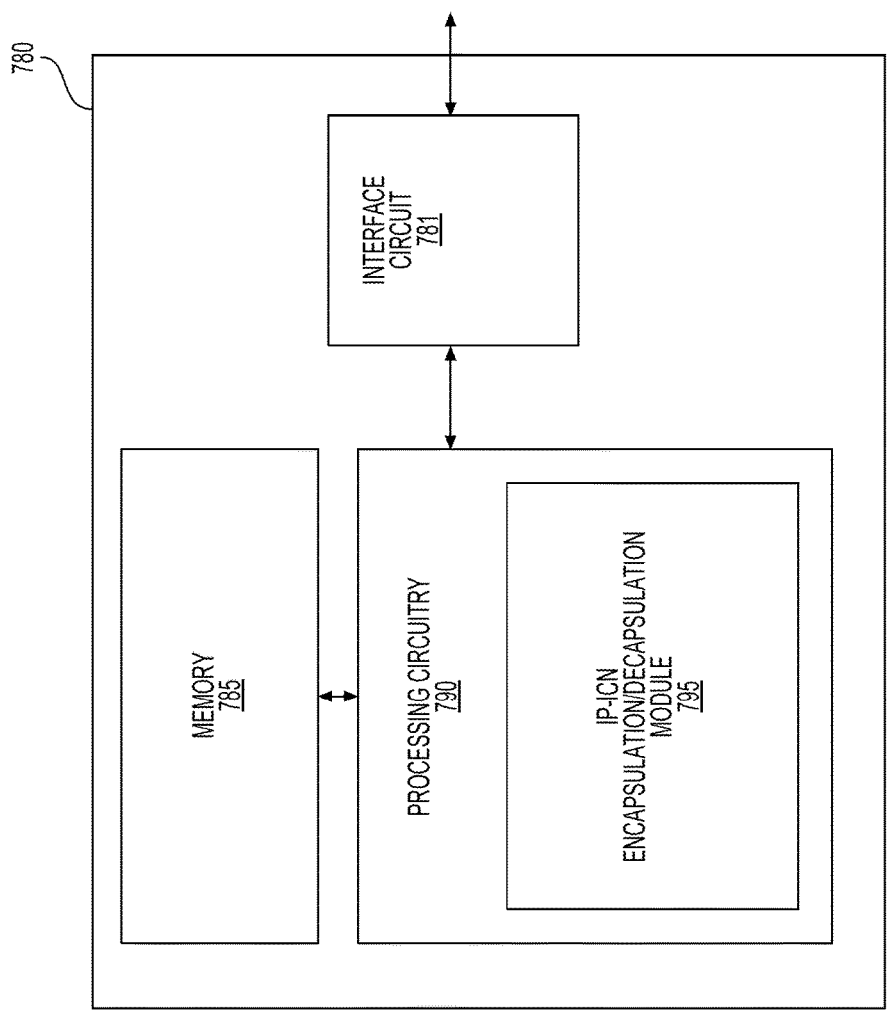
FIG. 7A shows a block diagram of a producer device 780 according to an embodiment of the disclosure.

FIG. 7A shows a block diagram of a producer device 780 according to an embodiment of the disclosure. In an example, the producer device 780 is used in the network system 100 in the place of the producer device 780. The producer device 780 includes an interface circuit 781, a processing circuitry 790 and a memory 785 coupled together as shown in FIG. 7A.

The interface circuit 781 is configured to receive signals and transmit signals that carry IP-ICN packets. The interface circuit 781 can be implemented using any suitable technology. In an embodiment, the interface circuit 781 is configured to receive and transmit wireless signals. In an example, the interface circuit 781 is configured to receive and transmit wireless signals according to a suitable wireless communication technology, such as second generation (2G) mobile network technology, third generation (3G) mobile network technology, fourth generation (4G) mobile network technology, fifth generation (5G) mobile network technology, global system for mobile communication (GSM), long-term evolution (LTE), WiFi technology, Bluetooth technology, and the like. In another embodiment, the interface circuit 781 is configured to accept wires and is electronically connected to the wires (e.g., Ethernet cable, USB cable). The wires couple the producer device 780 with another device, such as the router 140, and the like. The interface circuit 781 receives signals transmitted from the other device over the wires or transmits signals onto the wires.

The processing circuitry 790 is configured to perform packet processing for IP-ICN packets. In the FIG. 7A example, the processing circuitry 790 includes IP-ICN encapsulation/de-capsulation module 795. In an example, the IP-ICN encapsulation/de-capsulation module 795 is configured to de-capsulate an IP-ICN interest packet in the packet format 200 to extract an interest packet in the ICN technology. In another example, the IP-ICN encapsulation/de-capsulation module 795 is configured to encapsulate a data packet in the ICN technology into an IP-ICN data packet, such as in the packet format 200.

The memory 785 is configured to store software instructions and data.

In an embodiment, the IP-ICN encapsulation/de-capsulation module 795 is implemented as circuitry. In another embodiment, the IP-ICN encapsulation/de-capsulation module 795 is implemented as a processor (e.g., central processing unit) executing software instructions stored in the memory 785.

Figure 7B:
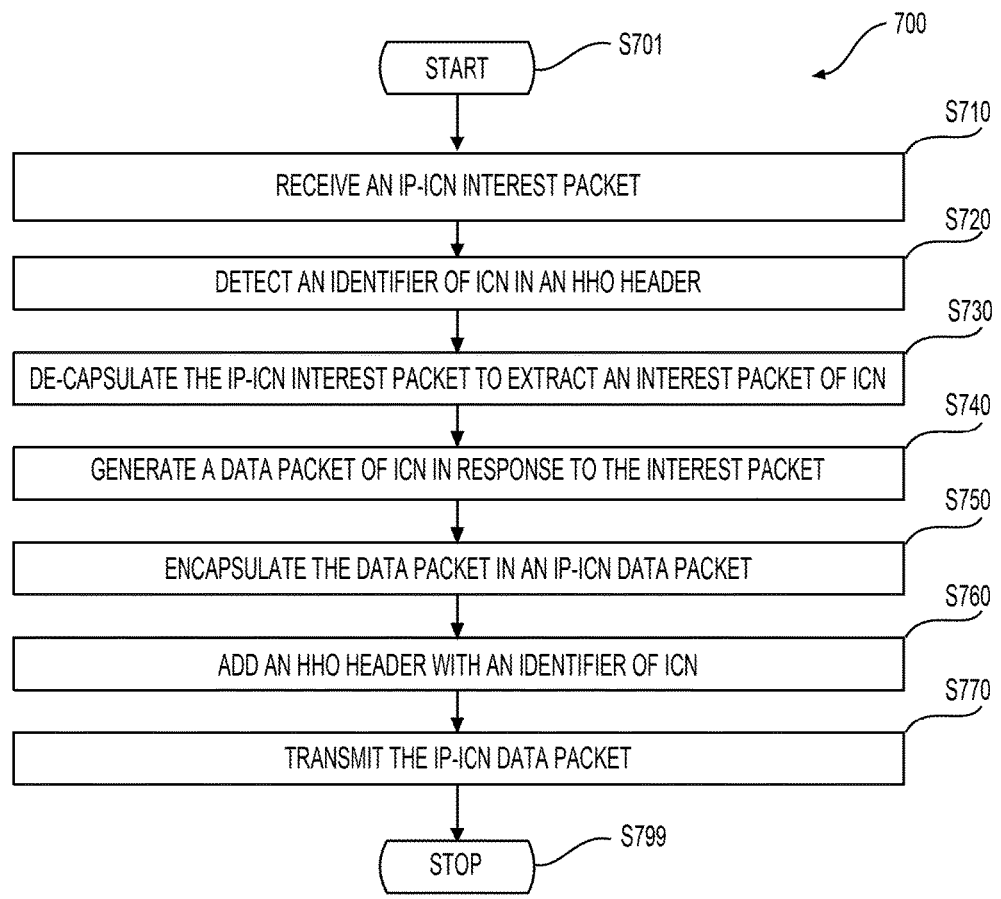
FIG. 7B shows a flow chart outlining a process executed by the producer device 780 according to an embodiment of the disclosure.

FIG. 7B shows a flow chart outlining a process 700 executed by the producer device 780 according to an embodiment of the disclosure. The process starts at S701 and proceeds to S710.

At S710, an IP-ICN interest packet is received. In an example, the interface circuit 781 receives signals carrying an IP-ICN interest packet.

At S720, an HHO header with an ICN identifier of ICN technology is detected.

In an example, the producer device 780 parses the header of the IP-ICN interest packet, and detects an HHO header. Further, the producer device 780 detects that an option type in the HHO header is indicative of an interest packet and detects, for example, a content identifier of ICN technology in the HHO header.

At S730, the IP-ICN interest packet is de-capsulated to extract an interest packet of the ICN technology. In an example, the producer device 780 extracts a payload of the IP-ICN interest packet. The interest packet is then suitably handled according to the ICN technology.

At S740, a data packet is generated in response to the interest packet. In an example, the producer device 780 retrieves a content object with a matching content name of the interest packet, and generates a data packet of the ICN technology to carry the content object.

At S750, the data packet is encapsulated in an IP-ICN data packet. In an example, the producer device 780 generates an IP-ICN data packet with an IP header (e.g., IPv6 header). In an example, the producer device 780 determines the IP header based on the IP address information in the IP-ICN interest packet. Then, the producer device 780 encapsulates (e.g., by the IP-ICN encapsulation/de-capsulation module 795) the data packet into the IP-ICN data packet, for example as a payload of the IP-ICN data packet.

At S760, an HHO header with an ICN identifier is added in the IP-ICN data packet. In an example, the producer device 780 suitably adds an HHO header in the IP-ICN data packet, and includes the content identifier in the HHO header. The HHO header is also configured to be indicative of a data packet.

At S770, the IP-ICN data packet is transmitted. In an example, the interface circuit 781 transmits signals carrying the IP-ICN data packet. Then the process proceeds to S799 and terminates.

Figure 8:
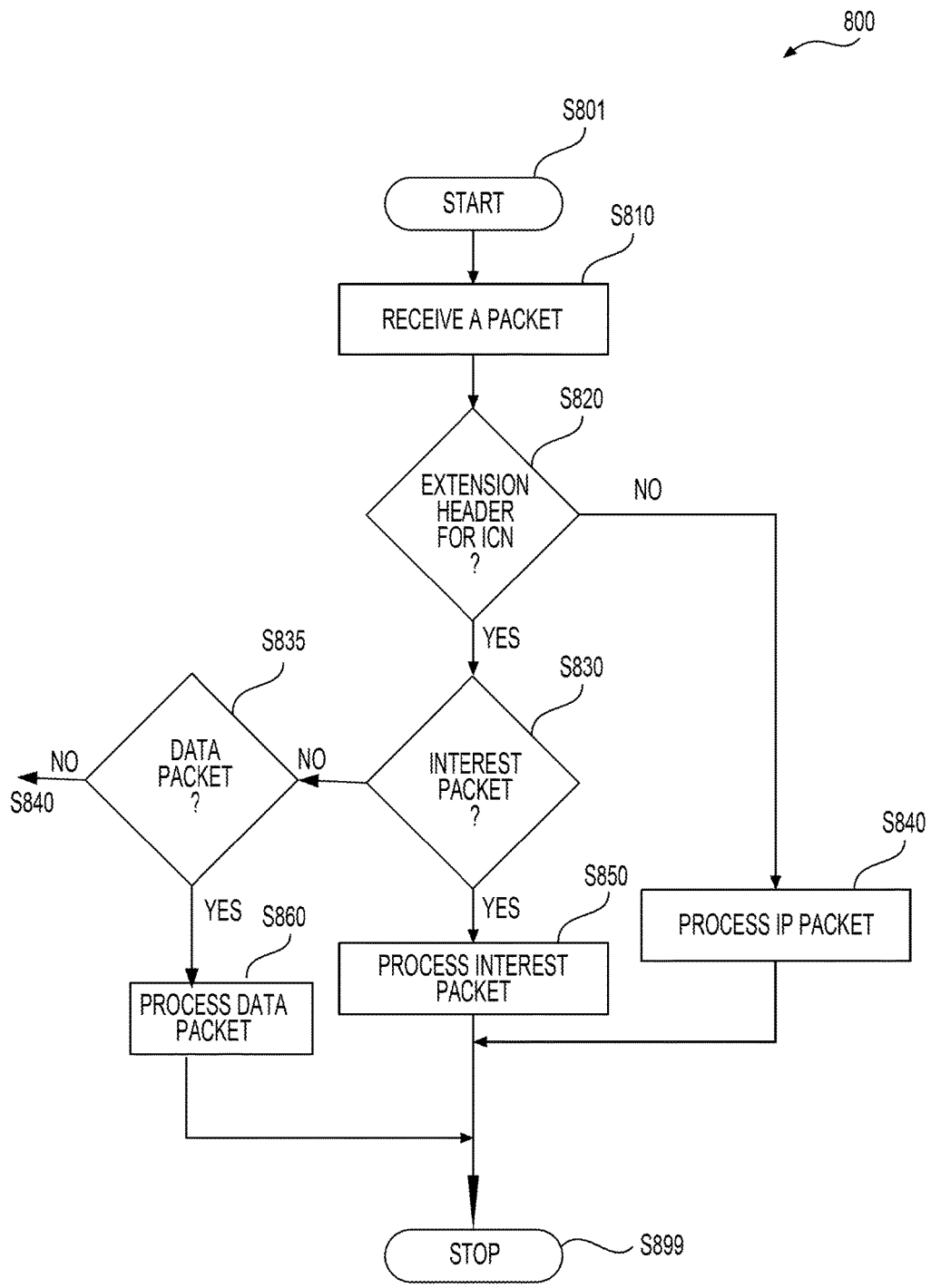
FIG. 8 shows a flow chart outlining a process example 800 according to an embodiment of the disclosure.

FIG. 8 shows a flow chart outlining a process example 800 according to an embodiment of the disclosure. In an example, the process 800 is executed by a network device, such as the network device 110, the network device 410 and the like. The process starts at S801 and proceeds to S810.

At S810, a packet is received and is parsed to extract packet headers. In an example, the network device receives signals carrying a packet. The network device parses the packet and extracts a fixed header, such as the fixed header 210. When the fixed header is indicative of an extension header, such as an HHO header, the network device extracts the extension header. In an example, the network device extracts multiple extension headers.

At S820, the network device determines whether the extension header is indicative of ICN. In an example, extension header includes an option type field. When the option type field is indicative of interest packet or data packet in the ICN technology, the process proceeds to S830; otherwise, the process proceeds to S840.

At S830, when the option type field is indicative of an interest packet, the process proceeds to S850; otherwise, the process proceeds to S835.

At S835, when the option type field is indicative of a data packet, the process proceeds to S860; otherwise, the process proceeds to S840.

At S840, the packet is an IP packet, and network device processes the packet according to suitable IP protocol. Then the process proceeds to S899 and terminates.

At S850, the packet is an IP-ICN interest packet, and the network device decapsulates the IP-ICN interest packet to extract the interest packet, and processes the interest packet according to ICN technology. Then the process proceeds to S899 and terminates.

Specifically, in an example of S850, the network device 410 updates SDT 535 based on source socket information and destination socket information in the packet header of the IP-ICN interest packet. Further, the network device extracts a content identifier, for example from the HHO header, and retrieves the CS 532 for a content object with matching name to the content identifier. When the retrieval is successful, the network device 410 suitably encapsulates the content object in an IP-ICN data packet and sends the IP-ICN data packet. When the retrieval fails, in an example, the network device 410 searches the FLT 533. When the content identifier exists in the FLT 533, the network device 410 forwards the interest packet according to the information in the FLT 533, for example to a local device.

When the content identifier does not exist in the FLT 533, in an example, the network device 410 searches the PIT 531. When an interest with the content identifier exists in the PIT 531, the network device 410 updates the PIT 531 to aggregate the interest. Then the process proceeds to S899 and terminates.

In an embodiment, when no interest with the content identifier exists in the PIT 531, the network device 410 updates the PIT 531 to add an entry with a new pending interest in the PIT 531. The new pending interest includes the content identifier and other fields, such as a remaining time before the new pending interest expires and the like. In an example, the network device 410 updates the IP-ICN interest packet (e.g., change the source IP address field to carry the IP address of the network device 410), and forwards the updated IP-ICN interest packet. Then the process proceeds to S899 and terminates.

At S860, the packet is an IP-ICN data packet, and the network device decapsulates the IP-ICN data packet to extract a data packet, and processes the data packet according to ICN technology. Then the process proceeds to S899 and terminates.

Specifically, in an example of S860, the network device 410 extracts a content identifier, for example from the HHO header. Then the network device 410 searches the PIT 531 for an interest that matches the content identifier. When the PIT 531 does not have a matching interest to the content identifier, the network device 410 drops the IP-ICN data packet. When the PIT 531 has a matching interest, the network device 410 generates IP-ICN data packets to send according to SDT indexes associated with the matching interest. The network device 410 then updates the PIT 531, the CS 532 and the FLT 533 based on the received IP-ICN data packet according to suitable ICN technology.

Figure 9:
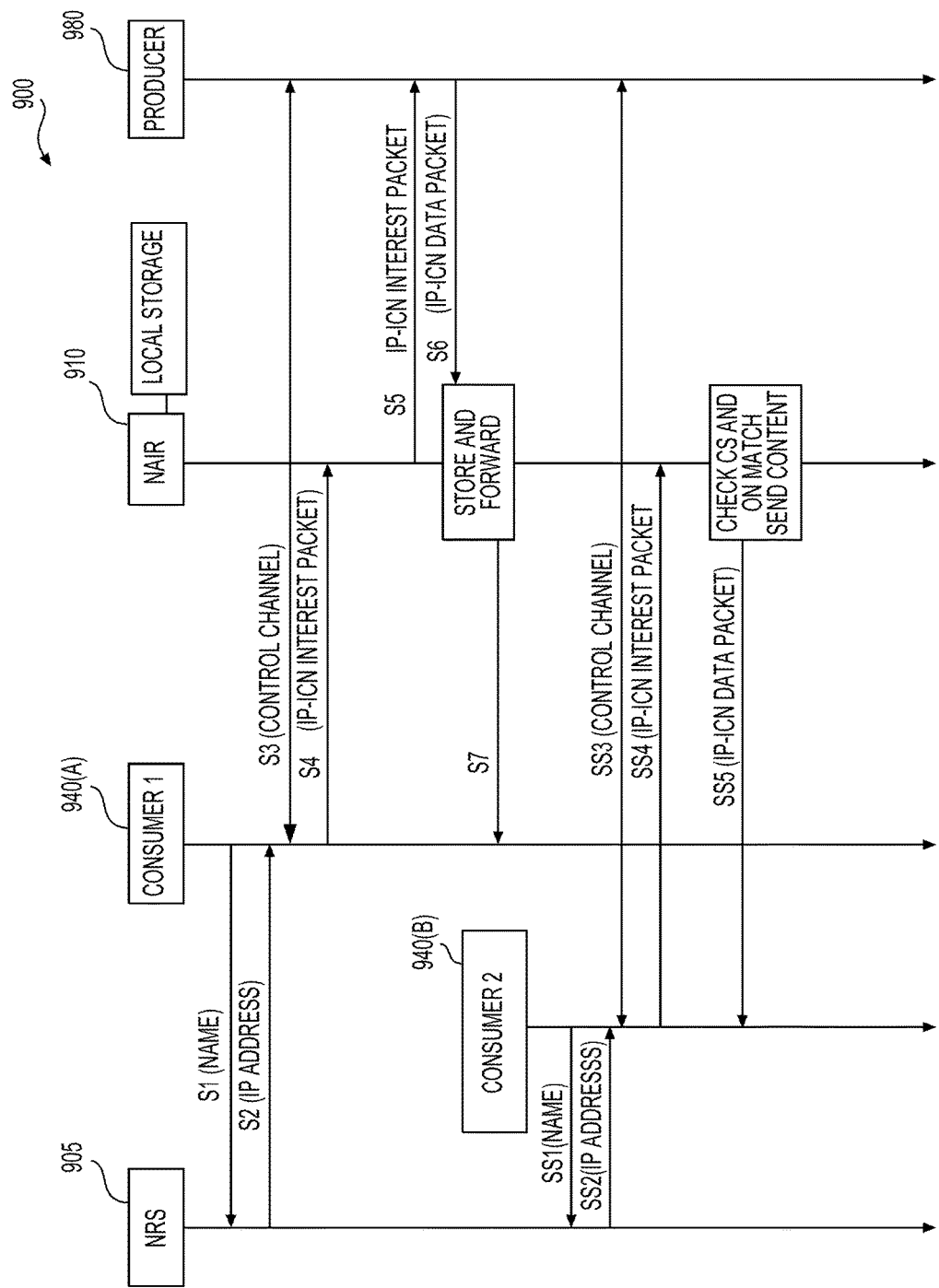
FIG. 9 shows a diagram of communication steps in a network system 900 according to an embodiment of the disclosure.

FIG. 9 shows a diagram of communication in a network system 900 according to an embodiment of the disclosure. The network system 900 is similarly configured as the network system 100. In the FIG. 9 example, the network system 900 includes a first consumer device 940(A), a second consumer device 940(B), a NAIR 910, a producer device 980, and an NRS server 905. In an example, the first consumer device 940(A) and the second consumer device 940(B) are similarly configured as the client device 140 and/or the client device 640, the NAIR 910 is similarly configured as the NAIR 110 and/or the network device 410, the producer device 980 is similarly configured as the producer device 180 and/or the producer device 780, and the NRS 905 is similarly configured as the NRS 105.

In an example, the communication in the network system 900 happens in a sequence of S1-S7 and SS1-SS5.

At S1, the first consumer device 940(A) sends a request to the NRS 905 to request name resolution service for a name (NAME) to locate a producer device that provides content object having matching content name.

At S2, the NRS 905 provides an IP address of a producer device, such as the producer device 980, to the first consumer device 940(A). The producer device 980 can provide content object with matching content name to the name.

At S3, the first consumer device 940(A) setups a control channel with the producer device 980. For example, an application running on the first consumer device 940(A) can initiate a communication with an application running the producer device 980. The first consumer device 940(A) and the producer device 980 can shake hands and perform authorization and the like to setup the control channel.

At S4, the first consumer device 940(A) generates an IP-ICN interest packet, for example in the packet format 200, that encapsulates an interest packet. The interest packet is used in the ICN technology. The IP-ICN interest packet is received at the NAIR 910.

In an embodiment, the NAIR 910 decapsulates the IP-ICN interest packet to extract the interest packet, and processes the interest packet according to ICN technology. For example, the NAIR 910 updates a socket description table, such as the SDT 535 and the like, based on source socket information and destination socket information in the packet header of the IP-ICN interest packet. Further, the NAIR 910 extracts a content identifier from the interest packet, such as from the HHO header, and retrieves from a local storage, e.g., the CS 532, a content object with matching name to the content identifier. In the FIG. 9 example, the content identifier is first received by the NAIR 910 and thus the retrieval fails. Then, in an example, the NAIR 910 updates a pending interest table, such as the PIT 531, to add an entry for a pending interest with the content identifier in the PIT 531.

At S5, the NAIR 910 updates the IP-ICN interest packet (e.g., change the source IP address field to have the IP address of the NAIR 910), and forwards the updated IP-ICN interest packet to the producer device 980.

At S6, the producer device 980 generates a data packet according to the ICN technology, and encapsulates the data packet in an IP-ICN data packet for example in the packet format 200, and sends the IP-ICN data packet to the NAIR 910. For example, the destination address field has the IP address of the NAIR 910.

When the NAIR 910 receives the IP-ICN data packet, the NAIR 910 decapsulates the IP-ICN data packet, and extracts the data packet. In an example, the NAIR 910 stores the data packet locally, such as a memory in the NAIR 910, an external memory connected to the NAIR 910 and the like.

At S7, the NAIR 910 encapsulates the data packet in another IP-ICN data packet that is destined to the first consumer device 940(A) (e.g., the destination IP address field has the IP address of the first consumer device 940(A)).

At SS1, the second consumer device 940(B) sends a request to the NRS 905 to request name resolution service for the same name (NAME) to locate the producer device 980 that provides content object with matching content name as the name.

At SS2, the NRS 905 provides the IP address of the producer device 980 to the second consumer device 940(B).

At SS3, the second consumer device 940(B) setups a control channel with the producer device 980. For example, the second consumer device 940(B) and the producer device 980 can shake hands and perform authorization, and the like to setup the control channel.

At SS4, the second consumer device 940(B) generates an IP-ICN interest packet, for example in the packet format 200, that encapsulates an interest packet. The interest packet is used in the information centric network technology. The IP-ICN interest packet is received by the NAIR 910.

In an embodiment, the NAIR 910 decapsulates the IP-ICN interest packet to extract the interest packet, and processes the interest packet according to ICN technology. For example, the NAIR 910 extracts the content identifier from the interest packet, such as from the HHO header, and retrieves from the local storage, e.g., the CS 532, the content object with matching name to the content identifier. In the FIG. 9 example, the retrieval is successful.

At SS5, the NAIR 910 encapsulates the content object in an IP-ICN data packet that is destined to the second consumer device 940(B) (e.g., the destination IP address field has the IP address of the second consumer device 940(B)), and sends the IP-ICN data packet to the second consumer device 940(B).

Figure 10:
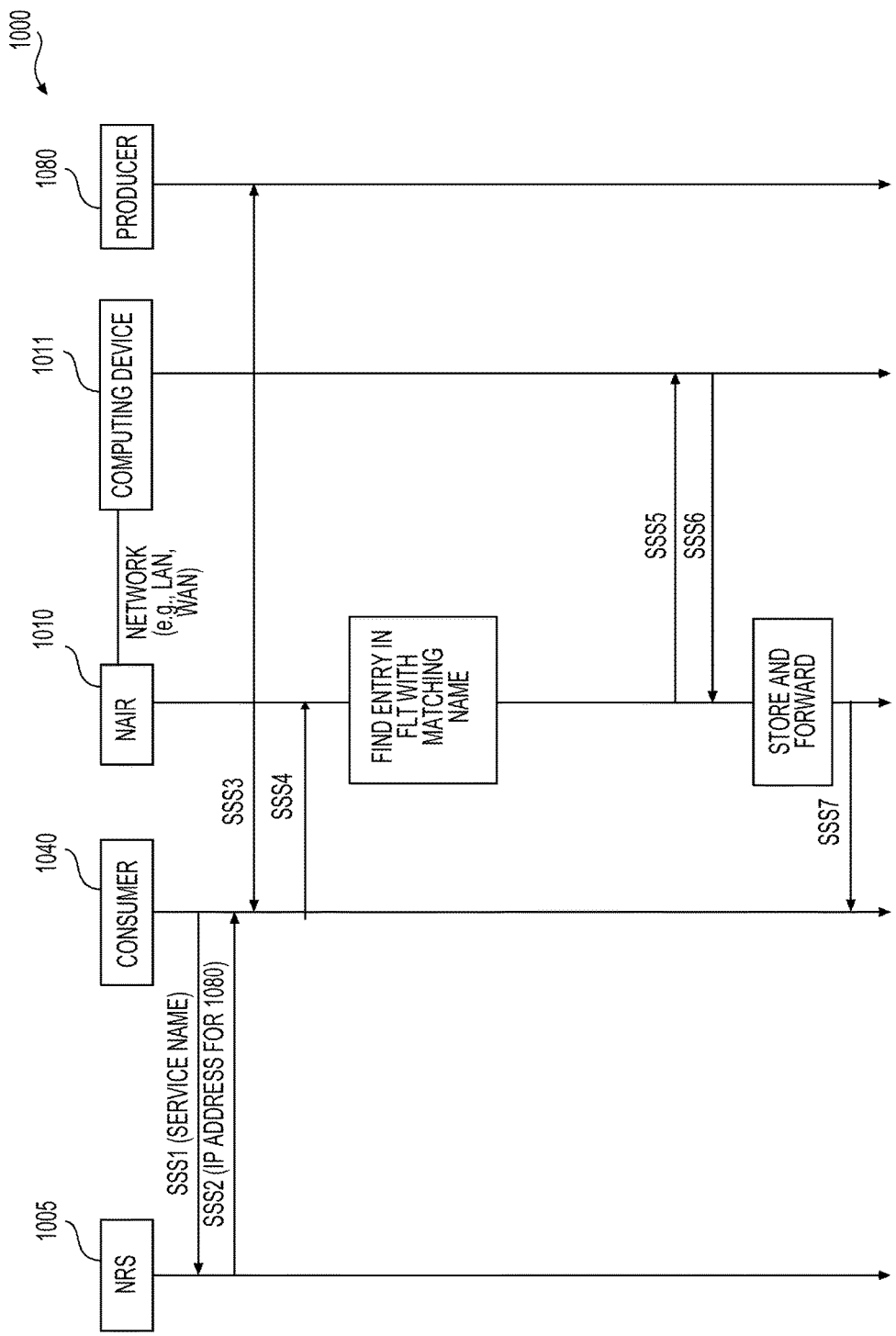
FIG. 10 shows a diagram of communication steps in a network system 1000 according to an embodiment of the disclosure.

FIG. 10 shows a diagram of communication in a network system 1000 according to an embodiment of the disclosure. The network system 1000 is similarly configured as the network system 100. In the FIG. 10 example, the network system 1000 includes a consumer device 1040, a NAIR 1010, a producer device 1080, and an NRS 1005. In an example, the consumer device 1040 is similarly configured as the client device 140 and/or the client device 640, the NAIR 1010 is similarly configured as the NAIR 110 and/or the network device 410, the producer device 1080 is similarly configured as the producer device 180 and/or the producer device 780, and the NRS 1005 is similarly configured as the NRS 105.

In the FIG. 10 example, the producer device 1080 is configured to provide a computing service. The NAIR 110 is part of a network, such as LAN, wide area network (WAN) and the like, and the network includes a specific device 1011 that can provide an in-network computing service similarly to the producer device 1080. In an example, the NAIR 110 includes a FLT that associates a route to the specific device 1011 with a name of the computing service.

In an example, the communication in the network system 1000 happens in a sequence of SSS1-SSS6.

At SSS1, the consumer device 1040 sends a request to the NRS 1005 to request name resolution service for the computing service (SERVICE NAME) to locate a producer device that provides the computing service.

At SSS2, the NRS 1005 provides an IP address for a producer device, such as the producer device 1080, to the consumer device 1040. The producer device 1080 can provide the computing service.

At SSS3, the consumer device 1040 setups a control channel with the producer device 1080. For example, the consumer device 1040 and the producer device 1080 can shake hands and perform authorization, and the like.

At SSS4, the consumer device 1040 generates an IP-ICN interest packet, for example in the packet format 200 that encapsulates an interest packet. The interest packet is used in the information centric network technology. The IP-ICN interest packet is received by the NAIR 1010.

In an embodiment, the NAIR 1010 decapsulates the IP-ICN interest packet to extract the interest packet, and processes the interest packet according to ICN technology. For example, the NAIR 1010 updates a socket description table, such as the SDT 535 and the like, based on source socket information and destination socket information in the packet header of the IP-ICN interest packet. Further, the NAIR 1010 extracts a content identifier from the interest packet, such as from the HHO header. The content identifier is indicative of the computing service. In the FIG. 10 example, the NAIR 1010 searches the FLT, and find an entry with matching content name to the content identifier. In an example, the route in the FLT is prioritized higher than default forwarding information base (FIB) according to the IP protocol.

At SSS5, the NAIR 1010 sends the interest packet to the specific device 1011. In an example, the NAIR 1010 updates the IP-ICN interest packet (e.g., change the source IP address field to have the IP address of the NAIR 1010, and change the destination IP address field to have the IP address of the specific device 1011), and forwards the updated IP-ICN interest packet to the specific device 1011.

At SSS6, the specific device 1011 performs the computing service and generates results. Further, the specific device 1011 generates a data packet carrying the results according to the ICN technology, and encapsulates the data packet in an IP-ICN data packet, and sends the packet to the NAIR 1010. For example, the destination address field has the IP address of the NAIR 1010.

At SSS7, the NAIR 1010 receives the IP-ICN data packet, and extracts the data packet. In an example, the NAIR 1010 stores the data packet, and updates the IP-ICN data packet to destine to the consumer device 1040 (change the destination IP address field to have the IP address of the consumer device 1040). Then, the NAIR 1010 forwards the updated IP-ICN data packet to the consumer device 1040.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An electronic device comprising:
   interface circuitry configured to receive and transmit signals carrying packets; and
   processing circuitry configured to:
   detect a received packet that includes an Internet protocol (IP) header and an extension header to the IP header, the extension header carrying an information centric networking (ICN) identifier; and
   after the received packet is detected,
   extract the ICN identifier from the extension header, and
   when an interest packet for the ICN identifier is determined to be encapsulated in the received packet and when retrieval of a matched content object with a matching name to the ICN identifier fails, update the received packet to become an updated packet by replacing a source IP address field with an IP address of the electronic device, and forward the updated packet via the interface circuitry.

2. The electronic device of claim 1, wherein the processing circuitry is configured to detect that the received packet includes a hop-by-hop option header for carrying the ICN identifier.

3. The electronic device of claim 1, wherein the processing circuitry is configured to extract the source IP address and a destination IP address from the IP header of the received packet, and update a stored record to track the source IP address and the destination IP address.

4. The electronic device of claim 3, wherein the processing circuitry is configured to aggregate interest based on the stored record.

5. The electronic device of claim 1, wherein the processing circuitry is configured to:
   after the received packet is detected, when the interest packet for the ICN identifier is determined to be encapsulated in the received packet and when the retrieval of the matched content object with the matching name to the ICN identifier succeeds, generate an outgoing packet that includes an IP header and encapsulates the matched content object.

6. The electronic device of claim 1, wherein the processing circuitry is configured to:
   after the received packet is detected, when a data packet for the ICN identifier is determined to be encapsulated in the received packet, extract a received content object corresponding to the ICN identifier from the received packet, generate one or more outgoing packets that encapsulate the received content object and have one or more respective destination IP addresses different from a destination IP address of the received packet, and forward the one or more outgoing packets via the interface circuitry.

7. A method for communication, comprising:

receiving signals carrying packets;

detecting, by processing circuitry of an electronic device, a received packet that includes an Internet protocol (IP) header and an extension header to the IP header, the extension header carrying an information centric networking (ICN) identifier; and after the received packet is detected, extracting the ICN identifier from the extension header, and when an interest packet for the ICN identifier is determined to be encapsulated in the received packet and when retrieval of a matched content object with a matching name to the ICN identifier fails, updating the received packet to become an updated packet by replacing a source IP address field with an IP address of the electronic device, and forwarding the updated packet.

8. The method of claim 7, wherein detecting the received packet further comprises:

detecting that the received packet includes a hop-by-hop option header for carrying the ICN identifier.

9. The method of claim 7, further comprising:

extracting the source IP address and a destination IP address from the IP header of the packet; and updating a stored record to track the source IP address and the destination IP address.

10. The method of claim 9, further comprising:

aggregating interest based on the stored record.

11. The method of claim 7, further comprising:

after the received packet is detected, when the interest packet for the ICN identifier is determined to be encapsulated in the received packet and when the retrieval of the matched content object with the matching name to the ICN identifier succeeds, generating an outgoing packet that includes an IP header and encapsulates the matched content object.

12. The method of claim 7, further comprising:

after the received packet is detected, when a data packet for the ICN identifier is encapsulated in the received packet, extracting a received content object corresponding to the ICN identifier from the received packet, generating one or more outgoing packets that encapsulate the received content object and have one or more respective destination IP addresses different from a destination IP address of the received packet, and forwarding the one or more outgoing packets.

13. A non-transitory computer readable medium storing computer instructions that, when executed by a processor, cause the processor to perform:

receiving signals carrying packets;

detecting a received packet that includes an Internet protocol (IP) header and an extension header to the IP header, the extension header carrying an information centric networking (ICN) identifier; and after the received packet is detected, extracting the ICN identifier from the extension header, and when an interest packet for the ICN identifier is determined to be encapsulated in the received packet and when retrieval of a matched content object with a matching name to the ICN identifier fails, updating the received packet to become an updated packet by replacing a source IP address field with an IP address of the electronic device, and forwarding the updated packet.

14. The non-transitory computer readable medium of claim 13, wherein the computer instructions, when executed by the processor, further cause the processor to perform:

detecting that the received packet includes a hop-by-hop option header for carrying the ICN identifier.

15. The non-transitory computer readable medium of claim 13, wherein the computer instructions, when executed by the processor, further cause the processor to perform:

extracting the source IP address and a destination IP address from the IP header of the packet; and updating a stored record to track the source IP address and the destination IP address.

16. The non-transitory computer readable medium of claim 13, wherein the computer instructions, when executed by the processor, further cause the processor to perform:

after the received packet is detected, when the interest packet for the ICN identifier is determined to be encapsulated in the received packet and when the retrieval of the matched content object with the matching name to the ICN identifier succeeds, generating an outgoing packet that includes an IP header and encapsulates the matched content object.

17. The non-transitory computer readable medium of claim 13, wherein the computer instructions, when executed by the processor, further cause the processor to perform:

after the received packet is detected, when a data packet for the ICN identifier is encapsulated in the received packet, extracting a received content object corresponding to the ICN identifier from the received packet, generating one or more outgoing packets that encapsulate the received content object and have one or more respective destination IP addresses different from a destination IP address of the received packet, and forwarding the one or more outgoing packets.

18. An electronic device, comprising:

interface circuitry configured to receive and transmit signals carrying packets; and processing circuitry configured to:

generate an outgoing packet with an Internet protocol (IP) header and an extension header that carries an information centric networking (ICN) identifier;

when an interest packet for the ICN identifier is encapsulated in the outgoing packet, set a data field in the extension header to indicate that the interest packet is encapsulated in the outgoing packet, the interest packet for the ICN identifier including information for causing retrieval of a matched content object with a matching name to the ICN identifier and for causing, when the retrieval of the matched content object with the matching name to the ICN identifier fails, update of a source IP address field in the outgoing packet for packet-forwarding; and transmit the outgoing packet via the interface circuitry.

19. The electronic device of claim 18, wherein the processing circuitry is configured to generate the outgoing packet with a hop-by-hop option header for carrying the ICN identifier.

20. The electronic device of claim 18, wherein the processing circuitry is configured to:
when a data packet for the ICN identifier, which carries a transmitted content object corresponding to the ICN identifier, is encapsulated in the outgoing packet, set the data field in the extension header to indicate that the data packet is encapsulated in the outgoing packet.

* * * * *